United States Patent
Katagiri et al.

(10) Patent No.: US 9,454,320 B2
(45) Date of Patent: Sep. 27, 2016

(54) REDUCTION OF POWER CONSUMPTION OF A BUFFER IN A TAPE DRIVE

(71) Applicant: International Business Machines Corporation, Armonk, NY (US)

(72) Inventors: Takashi Katagiri, Tokyo (JP); Hisato Matsuo, Tokyo (JP); Rika Nagahara, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 127 days.

(21) Appl. No.: 14/455,800

(22) Filed: Aug. 8, 2014

(65) Prior Publication Data

US 2015/0058645 A1 Feb. 26, 2015

(30) Foreign Application Priority Data

Aug. 22, 2013 (JP) ................. 2013-172605

(51) Int. Cl.
 *G06F 1/32* (2006.01)
 *G06F 3/06* (2006.01)

(52) U.S. Cl.
 CPC ........... *G06F 3/0625* (2013.01); *G06F 1/3268* (2013.01); *G06F 1/3278* (2013.01); *G06F 3/0656* (2013.01); *G06F 3/0682* (2013.01); *G06F 2003/0691* (2013.01); *Y02B 60/126* (2013.01); *Y02B 60/1246* (2013.01)

(58) Field of Classification Search
 None
 See application file for complete search history.

(56) References Cited

U.S. PATENT DOCUMENTS

| | | | |
|---|---|---|---|
| 7,953,904 B2 | 5/2011 | Hemmi et al. | |
| 8,145,932 B2 | 3/2012 | Dawkins et al. | |
| 2007/0204124 A1* | 8/2007 | Van Gassel | G06F 1/3221 711/170 |
| 2010/0095029 A1* | 4/2010 | Katagiri | G11B 15/46 710/52 |

FOREIGN PATENT DOCUMENTS

| | | |
|---|---|---|
| JP | H0267615 A | 3/1990 |
| JP | 2002528835 A | 9/2002 |
| JP | 2004171541 A | 6/2004 |
| JP | 2005303458 | 10/2005 |
| JP | 2007102409 A | 4/2007 |
| JP | 2007286679 | 11/2007 |
| JP | 2008293189 | 12/2008 |
| JP | 2010055152 A | 3/2010 |
| JP | 2013041646 A | 2/2013 |

* cited by examiner

Primary Examiner — Paul Yanchus, III
(74) Attorney, Agent, or Firm — Zilka-Kotab, PC

(57) ABSTRACT

A method of reducing power consumption of a buffer for cache in a tape drive connected to a host in a communicable manner, according to one embodiment, includes detecting a transfer rate of data from the host or to the host, and determining a writing or reading rate of data to or from a tape based on the data transfer rate. A determination is made as to whether predetermined conditions including the data transfer rate, the data writing or reading rate, and a capacity of a buffer are satisfied, where the buffer includes at least two buffer areas. At least one of the buffer areas is selected when the predetermined conditions are satisfied. The selected buffer area is switched to a power saving mode.

12 Claims, 5 Drawing Sheets

REDUCTION OF POWER CONSUMPTION OF A BUFFER IN A TAPE DRIVE

RELATED APPLICATIONS

This application claims priority to Japanese Patent Application No. 2013-172605, filed Aug. 22, 2013, which is herein incorporated by reference.

BACKGROUND

The present invention relates to a tape drive, and more specifically to a method of reducing the power consumption of a buffer in a tape drive.

File systems such as a Linear Tape File System (LTFS) often use tape drives. In tape drives, data that is sent from a host during writing, and data that is read from a tape during reading are stored in a buffer. According to various embodiments, these bits of data in the buffer are written to the tape sequentially during writing, and transferred to the host sequentially during reading.

The data transfer rate (hereinafter called "tape transfer rate") required to write data to the tape or read data from the tape must be equal to the data transfer rate from the host or to the host (hereinafter called "host transfer rate"). This is because the amount of data in the buffer varies according to the relationship between the tape transfer rate and the host transfer rate and thus there is a need to keep the transfer rate of data to the host or from the host the same.

The size of the buffer described above is designed based on the maximum tape transfer rate supported by the tape drive. However, in most cases, the host transfer rate is less than half of the maximum tape transfer rate in an actual environment. In other words, the size of the buffer often has a sufficient amount of available room to read and write data via the host. Therefore, part of the buffer can be left unused according to the host transfer rate. Freeing up a portion of the buffer desirably conserves power of the buffer.

Japanese Patent Application Publication No. 2005-303458 discloses a communication apparatus that stores data in a buffer memory before transmitting, or after receiving the data. Furthermore, according to Japanese Patent Application Publication No. 2005-303458, the size of a data buffer for storing data is determined based on information on the data input/output rate when data is input to or output from the buffer memory.

U.S. Pat. No. 8,145,932 discloses that when the usage of an Information Handling System (IHS) such as a server is low, a Redundant Array of Independent Disks (RAID) controller selected on a storage network is switched to a power saving mode.

BRIEF SUMMARY

A method of reducing power consumption of a buffer for cache in a tape drive connected to a host in a communicable manner, according to one embodiment, includes detecting a transfer rate of data from the host or to the host, and determining a writing or reading rate of data to or from a tape based on the data transfer rate. A determination is made as to whether predetermined conditions including the data transfer rate, the data writing or reading rate, and a capacity of a buffer are satisfied, where the buffer includes at least two buffer areas. At least one of the buffer areas is selected when the predetermined conditions are satisfied. The selected buffer area is switched to a power saving mode.

A computer program product for reducing power consumption of a buffer for cache in a tape drive, according to one embodiment, includes a computer readable storage medium having program instructions embodied therewith, the program instructions executable by a controller to cause the controller to perform the foregoing method.

A tape drive apparatus according to one embodiment includes a magnetic head, a motor for driving a tape across the magnetic head, a buffer having at least two buffer areas, and a controller configured to perform the foregoing method.

DETAILED DESCRIPTION

Various embodiments described herein provide a methodology for reducing the power consumption of a buffer of a cache in a tape drive connected to a host. The buffer may include at least two or more buffer areas.

Some embodiments described herein provide a methodology for leaving part of a buffer unused according to the host transfer rate in order to achieve power saving of the buffer.

A method according to one embodiment includes: detecting a transfer rate of data from the host or to the host; determining a writing or reading rate of data to or from a tape based on the data transfer rate; determining whether predetermined conditions including the data transfer rate, the data writing or reading rate, and the capacity of the buffer are satisfied; selecting at least one of the buffer areas when the predetermined conditions are satisfied; and switching the selected buffer area to a power saving mode.

Further embodiments described herein include reducing the power consumption of the buffer by disabling part of the buffer according to the host transfer rate, or more specifically, according to a relationship among the transfer rate of data from the host or to the host, the writing or reading rate of data, to or from the tape, and the capacity of the buffer.

In one approach, when predetermined conditions expressed as $Cp<Cb*N$ (using a capacity "$Cp$" that can be switched to the power saving mode in the capacity of the buffer and a capacity "$Cb$" of the buffer area, where "$N$" denotes the number of buffer areas to be switched to the power saving mode) are satisfied, at least one of the buffer areas is selected and switched to a power saving mode.

According to yet further embodiments, a buffer area that is left unused may be selected while managing free space of the buffer in order to switch the selected buffer area to the power saving mode.

In another embodiment, the buffer area includes a dynamic random access memory chip (DRAM chip). Additionally, the switching of the buffer area to the power saving mode includes putting the selected DRAM chip into an operation stopping state or self-refreshing of the selected DRAM chip.

In a further approach, operation of the DRAM chip may be stopped or self-refreshed to reduce the power consumption of the DRAM chip.

Figure 1:
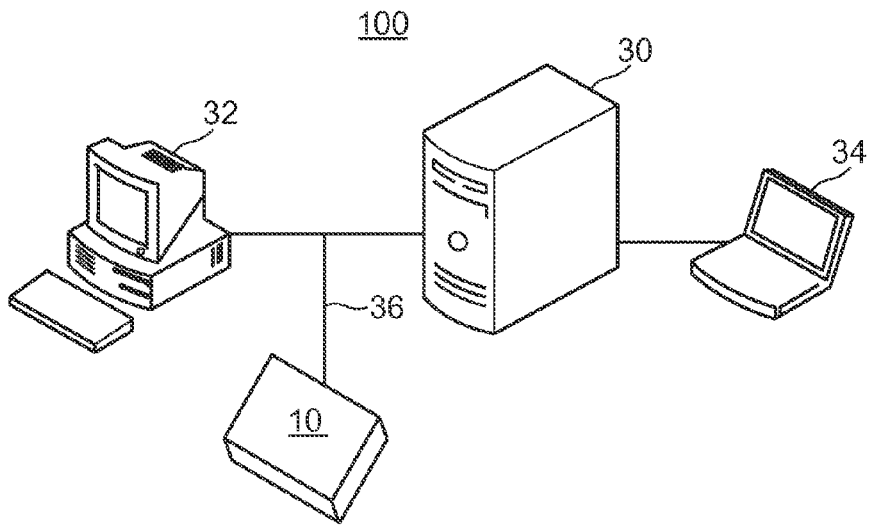
FIG. 1 is a diagram of a file system using a tape drive according to one embodiment.

Various embodiments described herein reference the accompanying drawings. FIG. 1 is an overview of a file system 100 using a tape drive 10 according to one embodiment. File system 100 is configured to include a tape drive 10, a host (server) 30, and PCs (terminals) 32, 34, which communicate with one another e.g., through a network 36. The tape drive 10 and the host (server) 30 are each illustrated as one component in FIG. 1, but may vary depending on the embodiment. FIG. 1 further includes tape drive 10 and host (server) 30, although two or more tape drives 10 and hosts (servers) 30 may be included in further embodiments.

In one approach, the file system 100 can be an LTFS (Linear Tape File System). Like a HDD, USB memory, CD-R, etc., or any other removable recording media, the LTFS provides a mechanism that enables direct access to a file stored in a tape cartridge when the tape cartridge is inserted into the tape drive.

Figure 2:
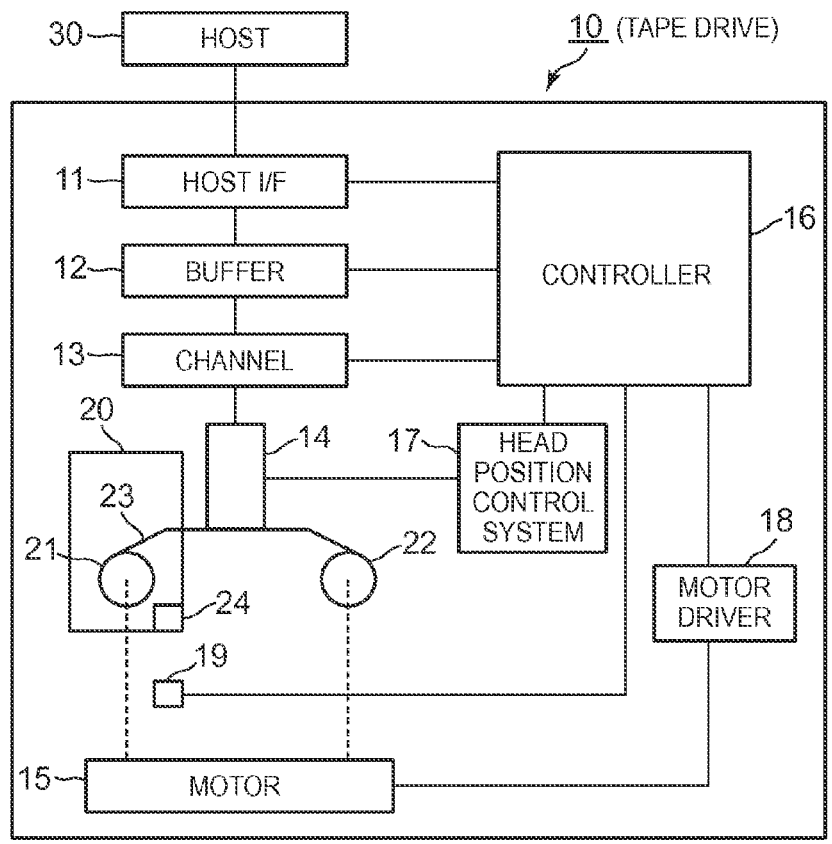
FIG. 2 is a diagram of a tape drive configuration according to one embodiment.

FIG. 2 is an overview of a tape drive configuration according to one embodiment. The tape drive 10 includes a host interface (hereinafter called "host I/F") 11, a buffer 12, a channel 13, a head 14, and a motor 15. The tape drive 10 also includes a controller 16, a head position control system 17, and a motor driver 18. According to one approach, a tape cartridge 20 may be loadable when the tape cartridge 20 is inserted into the tape drive 10. Tape cartridge 20 includes a tape 23 wound on reels 21 and 22. Additionally, the tape 23 moves in a longitudinal direction with the rotation of the reels 21 and 22 from the reel 21 to the reel 22 or alternatively, from the reel 22 to the reel 21. A magnetic tape is exemplified as the tape 23, but tape 23 may be any tape medium other than the magnetic tape depending on the embodiment.

Tape cartridge 20 may further include a cartridge memory (CM) 24. CM 24 records for example, information about how data was written on the tape 23, but could vary depending on the embodiment. Based on this recording, an index of data written on tape 23 in a noncontact mode using an RF interface or the usage of the tape 23 is checked to enable high-speed access to the data. In FIG. 2, such an RF interface responsible for performing access to the CM 24 is shown as a cartridge memory interface (hereinafter referred to as "CM I/F") 19.

With continued reference to FIG. 2, the host I/F 11 communicates with the host (server) 30 or the other PC 32, depending on the embodiment. For example, the host I/F 11 receives from the OS of the host 30 a command to instruct writing of data to the tape 23, a command to move the tape 23 to a target position, and a command to instruct reading of data from the tape 23. In the example of the LTFS mentioned above, data within the tape drive may be referred to directly from a desktop OS or the like. Additionally, a file can be executed by the double click or copied by the drag-and-drop action, similar to handling a file within an HDD.

Buffer 12 provides memory for cache accumulating data, e.g. transferred from the host 30 to be written to the tape 23, data read from the tape 23 to be transferred to the host 30, etc. The details of the buffer 12 will be further described below.

Channel 13 is a communication channel used to send to the head 14 data to be written to the tape 23. Channel 13 is furthermore a communication channel used to receive from the head 14 data read from the tape 23. Head 14 writes information to tape 23 and/or reads information from tape 23 when tape 23 moves in the longitudinal direction. Motor 15 drives the reels 21 and 22 so that they rotate. Note that although motor 15 is indicated by one rectangle in FIG. 2, motor 15 preferably includes two motors; one for each of the reels 21 and 22.

Controller 16 controls the entire tape drive 10. For example, controller 16 controls writing of data to tape 23 and reading of data from the tape 23 according to the commands accepted at the host I/F 11. Operations of methods described herein may be executed by the controller 16. Controller 16 also controls the head position control system 17, and the motor driver 18. The head position control system 17 is a system that is responsible for keeping track of a desired wrap. Herein, wrap refers to a group of multiple tracks on the tape 23. When it is necessary to switch from one wrap to another wrap, head 14 is also electrically switched. Electrical switching is controlled by the head position control system 17.

With continued reference to FIG. 2 motor driver 18 drives the motor 15. As mentioned above, in approaches where two motors 15 are used, two motor drivers 18 may be provided. The CM I/F 19 is, according to one embodiment, implemented by an RF reader/writer in order to write information to the CM 24 and read information from the CM 24.

Figure 3:
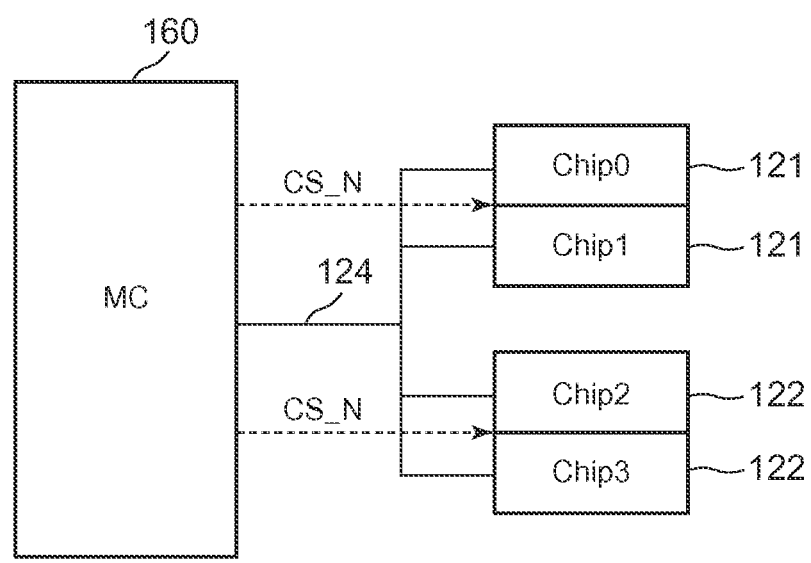
FIG. 3 is a schematic of a buffer configuration according to one embodiment.

FIG. 3 is a schematic of an exemplary buffer configuration of the buffer 12 of FIG. 2, according to one embodiment. FIG. 3 illustrates an embodiment in which the buffer is made up of DRAMs 121 and 122 to form two buffer areas. The DRAMs 121 and 122 are connected to a memory controller (MC) 160 via a bus 124. Each of the DRAMs 121 and 122 include two DRAM chips (0, 1), (2, 3), respectively. Furthermore, the two DRAM chips form one address space. The MC 160 according to various embodiments can be made up as part of the controller 16 in FIG. 2 or a memory controller dedicated to the DRAM chips.

The MC 160 may select, by a chip select signal CS_N, either of the two buffer areas (DRAM 121 or DRAM 122) as a buffer to be accessed. The following description is based on this configuration of FIG. 3, but the number of buffer areas (DRAMs) is not limited to two. Various embodiments described herein may be applied to approaches in which the number of buffer areas is any number of at least two or more. Furthermore, the buffer 12 may also be configured to include any kind of memory other than the DRAM e.g. a semiconductor memory, a magnetic memory, etc.

Figure 4:
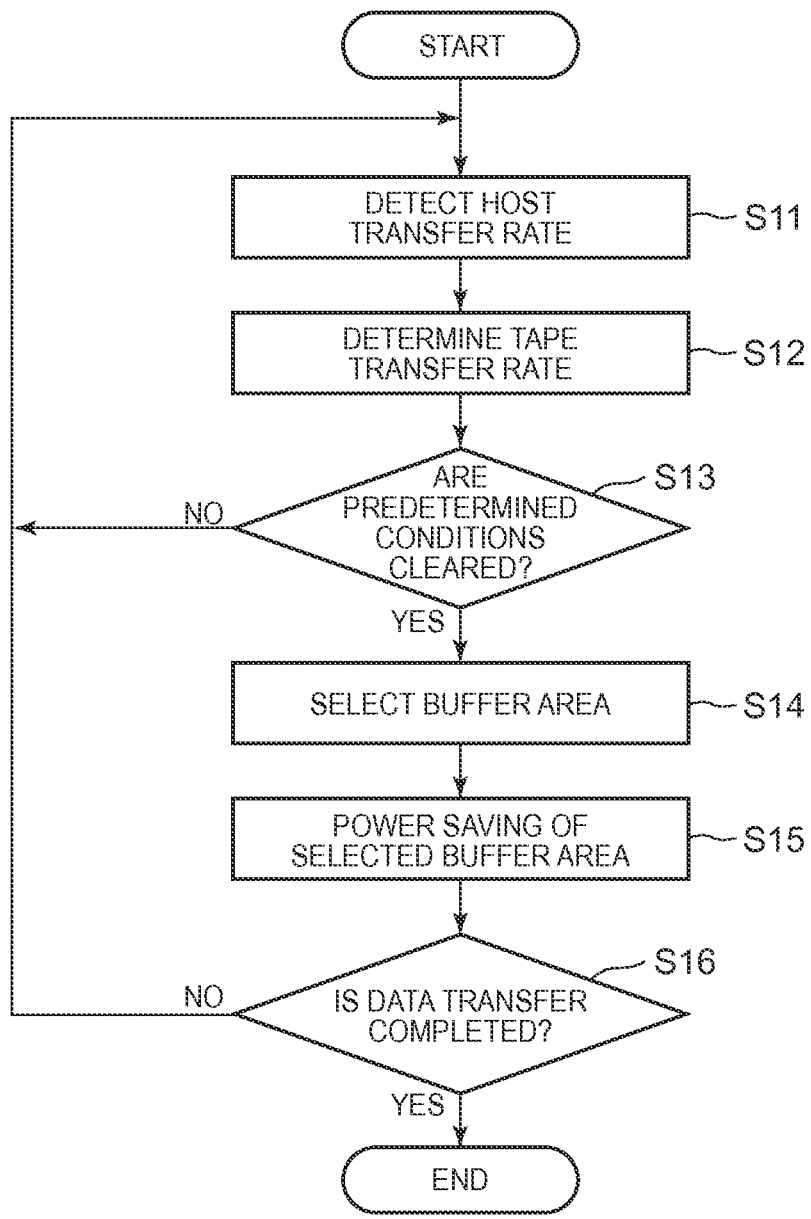
FIG. 4 is a chart showing a flow of a method according to one embodiment.

Referring to FIG. 4, operations of a method of reducing the power consumption of the buffer of various embodiments described herein will be described. For example, the flow in FIG. 4 may be performed by software executed on the controller 16/memory controller 160 in FIG. 2 and FIG. 3.

Figure 5:
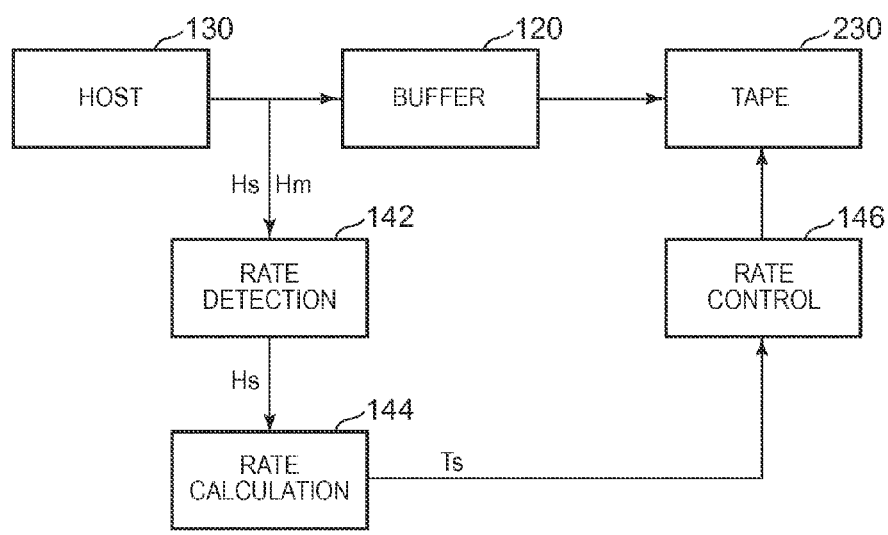
FIG. 5 is a chart depicting a relationship between a host transfer rate and a tape transfer rate according to one embodiment.

In operation S11, the transfer rate of data from the host or to the host (host transfer rate) is detected. In operation S12, the writing or reading rate of data to or from the tape (tape transfer rate) is determined based on the host transfer rate. Operations S11 and S12 are executed, for example, by a rate matching mechanism, as shown in FIG. 5. The rate matching mechanism may be implemented as part of the function of the controller 16 of FIG. 2.

In FIG. 5, a rate detection section 142 detects a host transfer rate Hs. Upon this detection, a maximum value Hm of host transfer rates Hs during a past certain period is also acquired. A rate calculation section 144 calculates a tape transfer rate Ts, e.g., a tape traveling speed or a writing or reading rate of data to or from the tape 230, based on the host transfer rate Hs received from the rate detection section 142. The tape transfer rate Ts may be calculated by a predetermined calculating formula, or selected from preset multiple values. A rate control section 146 controls the traveling speed of the tape 230 through the motor driver (see 18 of FIG. 2), based on the tape transfer rate Ts received from the rate calculation section 144.

Referring again to FIG. 4, it is determined in operation S13 whether predetermined conditions including the host transfer rate, the tape transfer rate, and the capacity of the buffer are satisfied. For example, according to one approach the predetermined conditions can be expressed by the following inequality (1):

$$Cp<Cb*N \qquad (1),$$

where "Cp" denotes a capacity that can be switched to a power saving mode in the capacity of the buffer, "Cb" denotes the capacity of one buffer area, and "N" denotes the number of buffer areas to be switched to the power saving mode. If the conditions of inequality (1) are satisfied, it can be determined that there exists at least one or more buffer areas that can be switched to the power saving mode.

The capacity "Cp" in inequality (1) is expressed as:

$$Cp=Cm-(Hm*Tb) \qquad (2).$$

where the time required for a backhitch action is denoted by "Tb", the maximum value of data transfer rates is denoted by "Hm", and the maximum capacity of the buffer is denoted by "Cm". The tape backhitch action typically includes the following sequence of operations: decelerating the tape speed, accelerating the tape to a reverse direction after the tape is stopped, rewinding the tape to the position where the tape can be accelerated to the tape speed used, again decelerating the tape speed, accelerating the tape speed with read/write direction to the position where read/write restarts and tracking the head position. The time "Tb" required for the sequence of backhitch operations may be approximately determined by the following equation (3):

$$Tb=4Ta+2Tt \qquad (3),$$

where "Ta" denotes a tape acceleration time and "Tt" denotes a time prior to the head position being tracked.

In operation S14, storing data is stopped in order to select a buffer area(s) (DRAM chip(s)) to be switched to the power saving mode. This selection is made by using the chip select signal CS_N in the buffer configuration of FIG. 3. Any number of one or more buffer areas may be selected according to the total number of buffer areas in a range satisfying inequality (1).

In operation S15, the selected buffer area(s) (DRAM chip(s)) is switched to the power saving mode. In the case of a DRAM chip, this operation of switching to the power saving mode is executed, for example, by putting the selected DRAM chip into an operation stopping state/sleep state, or by self-refreshing the DRAM chip. In operation S16, it is determined whether data transfer from the host has been completed or not. Operations S11 to S15 are repeated until the data transfer from the host has been completed.

Figure 6:
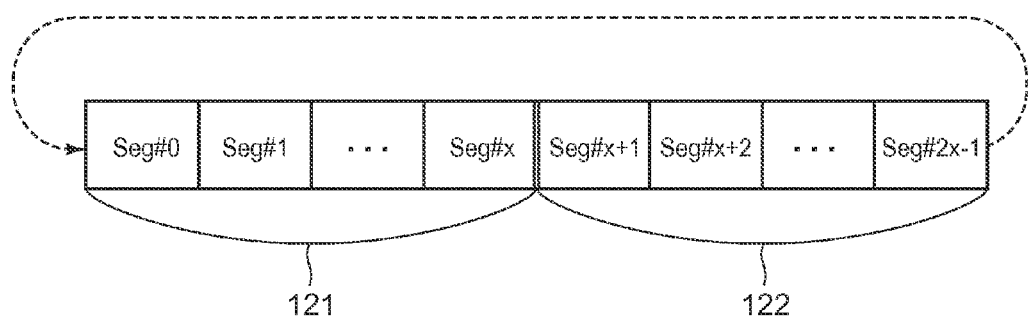
FIG. 6 is a schematic of a DRAM chip configuration according to one embodiment.
Figure 7:
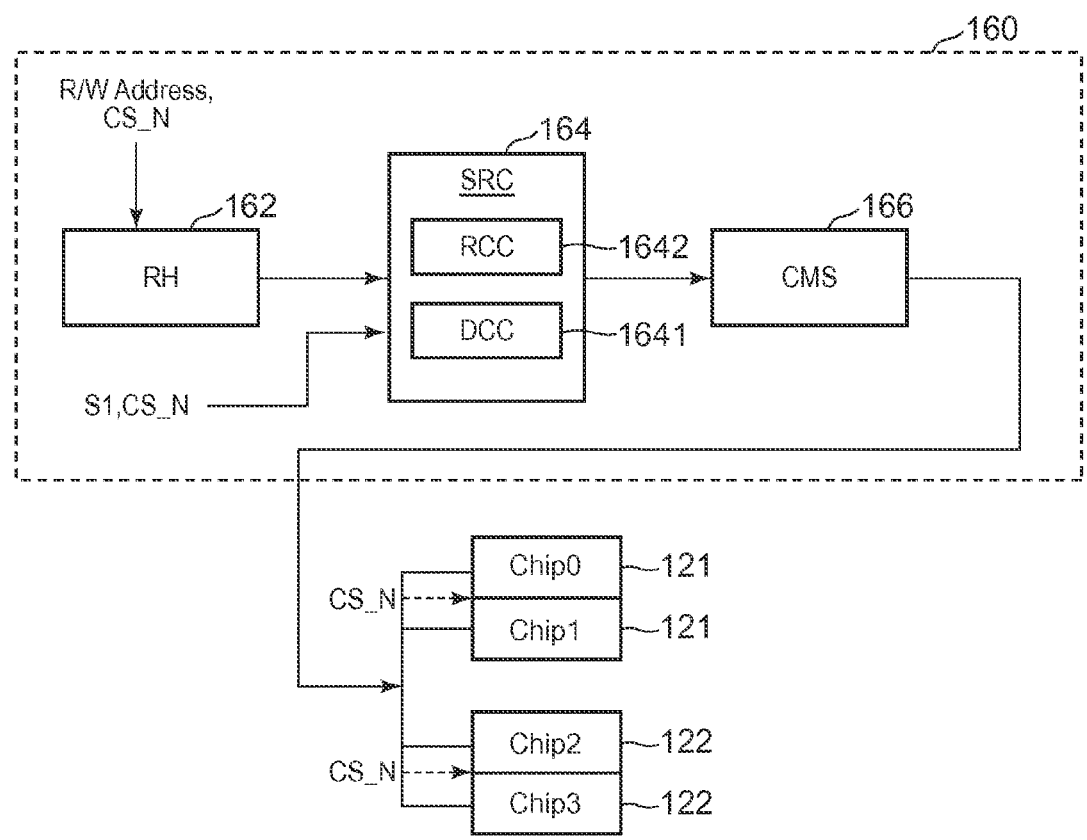
FIG. 7 is a schematic illustrating a self-refresh configuration of a DRAM chip according to one embodiment.

Referring next to FIG. 6 and FIG. 7, a configuration for self-refreshing a DRAM chip to achieve power saving according to one approach will be described. FIG. 6 is a schematic of a DRAM chip configuration according to one embodiment. In FIG. 6, the buffer is made up of DRAMs 121 and 122 which form two buffer areas shown in FIG. 3. Each of the DRAMs 121 and 122 are made up of multiple segments, e.g., #0 to #x of DRAM 121. Each segment stores a data set as a unit of read/write from/to the tape 23. The following will describe self-refreshing upon writing data to the tape. In terms of self-refreshing upon reading data from the tape, the methods thereof may also function in the same manner; thus, descriptions herein will be made only in terms of self-refreshing upon writing data to the tape.

Data received from the host is stored in order starting from segment #x of the DRAM 121 to segment #(x+1), #(x+2), etc. of the DRAM 122. Data stored in each segment is written to the tape in the order of segment #x, segment #(x+1), #(x+2), etc. after encoding processing. In doing so, the encoding processing may require a predetermined time. Therefore, for example, while data transfer (writing) from the host to the buffer is being performed on segment #x, data is written from the buffer to the tape on segment #(x−W). Furthermore, because the encoding processing of data for "W" segments is not completed, the data is stored in the buffer.

When a DRAM is being placed in a self-refresh state, writing of data to the tape or receiving data from the host is temporarily interrupted so that both segment #x and segment #(x−W) may be stored in either the DRAM 121 or the DRAM 122. To interrupt writing to the tape temporarily, for example, data encoding processing in the buffer only has to be interrupted, temporarily. To interrupt the receiving of data from the host, for example, the completion of a write command may have failed to be returned to the host in the case of an SCSI.

After either of the two temporary interrupts is performed and it is confirmed that both of segment #X and segment #(X−W) are stored in either the DRAM 121 or the DRAM 122, the unused DRAM is self-refreshed. This self-refresh can desirably lead to a reduction in the power consumption of the DRAM. For example, in the case of a DDR3 SDRAM of Company A, since the standby (Active Standby current) power consumption is 77 mA (×16 width) and the self-refresh power consumption is 22 mA, the power consumption can be desirably reduced to less than one-third (28.5%).

FIG. 7 is a schematic illustrating a self-refresh configuration of a DRAM chip according to one embodiment. FIG. 7 includes a request handler (hereinafter referred to as "RH") 162 for coordinating requests within the memory controller 160, a self-refresh controller (hereinafter referred to as "SRC") 164 for controlling the self-refresh, and a command sequencer (hereinafter referred to as "CMS") 166 for issuing commands to the DRAMs 121 and 122. The following will describe the self-refresh operation in the configuration of FIG. 7.

According to FIG. 7, when the SRC 164 receives, from microcode, a self-refresh request S1 as a request for making a DRAM enter into the self-refresh state, a chip select number (CS_N) of the DRAM, and a data CS checker (hereinafter referred to as "DCC") 1641 in the SRC 164 performs the following processing. (a) When data transfer of the DRAM to be made to enter into the self-refresh state is not completed, e.g., when the address CS_N that is in the process of data transfer managed by the RH 162 is equal to the CS_N of the DRAM to be made to enter into the self-refresh state, the RH 162 waits until the data transfer is completed. After the completion of the transfer, the DCC 1641 transfers the self-refresh request S1 to a request CS checker (hereinafter referred to as "RCC") 1642 in the SRC 164. (b) When data transfer of the DRAM to be made to enter into the self-refresh state is completed, the DCC 1641 transfers the self-refresh request S1 immediately to the RCC 1642.

When receiving the self-refresh request S1 from the DCC 1641, or when the self-refresh is being conducted, the RCC 1642 performs the following processing: sending an error interrupt to the microcode to reject the access request when CS_N of a DRAM as the target of an R/W access request is equal to the CS_N of the DRAM to be made to enter into the self-refresh state. When the above two pieces of CS_N are not equal, the CMS 166 issues the command "SELF" to start the self-refresh based on CS_N information received from the RCC 1642, sends the command SELF to the target DRAM, and further transfers the access request to the DRAM that is not to be refreshed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following; a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified, in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments described herein include reference to the accompanying drawings, they should not be limited to any such embodiments. For example, in the aforementioned embodiment, the description is made by taking, as an example, a case where a DRAM is used as the buffer and refreshed, but embodiments described herein should not be limited to this case. The present invention is applicable to all tape drives using the temporary accumulation of data in a buffer that can shift to a power saving mode of some kind. The present invention can be carried out in modes to which various improvements, alterations, and modifications are added on the basis of the knowledge of those skilled in the art.

What is claimed is:

1. A method of reducing power consumption of a buffer for cache in a tape drive connected to a host in a communicable manner, the method comprising:
    detecting a transfer rate of data from the host or to the host;
    determining a writing or reading rate of data to or from a tape based on the data transfer rate;
    determining whether predetermined conditions including the data transfer rate, the data writing or reading rate, and a capacity of a buffer are satisfied, where the buffer includes at least two buffer areas,
    wherein the predetermined conditions are expressed by using a capacity Cp that can be switched to a power saving mode in the capacity of the buffer and a capacity Cb of the buffer area as follows:

$$Cp<Cb*N,$$

where N denotes a number of buffer areas to be switched to the power saving mode,
    wherein when a time required for a backhitch action is denoted by Tb, a maximum value of data transfer rates is denoted by Hm, and a maximum capacity of the buffer is denoted by Cm, the capacity Cp is expressed as:

$$Cp=Cm-(Hm*Tb);$$

selecting at least one of the buffer areas when the predetermined conditions are satisfied; and
    switching the selected at least one of the buffer areas to the power saving mode.

2. The method according to claim 1, wherein
    the selected at least one of the buffer areas includes a DRAM chip, and
    the switching of the at least one of the buffer areas to the power saving mode includes putting the selected DRAM chip into an operation stopping state or self-refreshing the selected DRAM chip.

3. The method according to claim 1, wherein the selected at least one of the buffer areas is unused when in the power saving mode.

4. The method according to claim 1, wherein reading or writing of data from or to the tape, or sending or receiving data to or from the host, is temporarily interrupted during switching the selected at least one of the buffer areas to a power saving mode.

5. A computer program product for reducing power consumption of a buffer for cache in a tape drive, the computer program product comprising a computer readable storage medium having program instructions embodied therewith, the program instructions executable by a controller to cause the controller to:
    detect, by the controller, a transfer rate of data from a host or to the host;
    determine, by the controller, a writing or reading rate of data to or from a tape based on the data transfer rate;
    determine, by the controller, whether predetermined conditions including the data transfer rate, the data writing or reading rate, and a capacity of a buffer are satisfied, where the buffer includes at least two buffer areas,
    wherein the predetermined conditions are expressed by using a capacity Cp that can be switched to a power saving mode in the capacity of the buffer and a capacity Cb of the buffer area as follows:

$$Cp<Cb*N,$$

where N denotes a number of buffer areas to be switched to the power saving mode,
    wherein when a time required for a backhitch action is denoted by Tb, a maximum value of data transfer rates is denoted by Hm, and a maximum capacity of the buffer is denoted by Cm, the capacity Cp is expressed as:

$$Cp=Cm-(Hm*Tb);$$

select, by the controller, at least one of the buffer areas when the predetermined conditions are satisfied; and
    switch, by the controller, the selected at least one of the buffer areas to the power saving mode.

6. The computer program product according to claim 5, wherein
    the selected at least one of the buffer areas includes a DRAM chip, and
    the switching of the at least one of the buffer areas to the power saving mode includes putting the selected DRAM chip into an operation stopping state or self-refreshing the selected DRAM chip.

7. The computer program product according to claim 5, wherein the selected at least one of the buffer area is unused when in the power saving mode.

8. The computer program product according to claim 5, wherein reading or writing of data from or to the tape, or sending or receiving data to or from the host, is temporarily interrupted during switching the selected at least one of the buffer areas to a power saving mode.

9. A tape drive apparatus, comprising:
    a magnetic head;
    a motor for driving a tape across the magnetic head;
    a buffer having at least two buffer areas; and
    a controller configured to:
        detect, by the controller, a transfer rate of data from a host or to the host;
        determine, by the controller, a writing or reading rate of data to or from a tape based on the data transfer rate;
        determine, by the controller, whether predetermined conditions including the data transfer rate, the data writing or reading rate, and a capacity of a buffer are satisfied, where the buffer includes at least two buffer areas, wherein the predetermined conditions are expressed by using a capacity Cp that can be switched to a power saving mode in the capacity of the buffer and a capacity Cb of the buffer area as follows:

$$Cp<Cb*N,$$

where N denotes a number of buffer areas to be switched to the power saving mode, wherein when a time required for a backhitch action is denoted by Tb, a maximum value of data transfer rates is denoted by Hm, and a maximum capacity of the buffer is denoted by Cm, the capacity Cp is expressed as:

$$Cp=Cm-(Hm*Tb);$$

select, by the controller, at least one of the buffer areas when the predetermined conditions are satisfied; and switch, by the controller, the selected at least one of the buffer areas to the power saving mode.

10. The apparatus according to claim 9, wherein the selected at least one of the buffer areas includes a DRAM chip, and the switching of the at least one of the buffer areas to the power saving mode includes putting the selected DRAM chip into an operation stopping state or self-refreshing the selected DRAM chip.

11. The apparatus according to claim 9, wherein the selected at least one of the buffer areas is unused when in the power saving mode.

12. The apparatus according to claim 9, wherein reading or writing of data from or to the tape, or sending or receiving data to or from the host, is temporarily interrupted during switching the selected at least one of the buffer areas to a power saving mode.

\* \* \* \* \*